(12) United States Patent
Stein (10) Patent No.: US 8,156,969 B2
(45) Date of Patent: Apr. 17, 2012

(54) UNDERGROUND STORAGE TANK WITH SEDIMENT TRAP

(75) Inventor: David E. Stein, Lebanon, PA (US)

(73) Assignee: J.D. Stein, Inc., Lebanon, PA (US)

( * ) Notice: Subject to any disclaimer, the term of this patent is extended or adjusted under 35 U.S.C. 154(b) by 324 days.

(21) Appl. No.: 12/420,594

(22) Filed: Apr. 8, 2009

(65) Prior Publication Data

US 2010/0108688 A1    May 6, 2010

Related U.S. Application Data

(60) Provisional application No. 61/111,885, filed on Nov. 6, 2008, provisional application No. 61/111,185, filed on Nov. 4, 2008.

(51) Int. Cl.
*B65B 1/04* (2006.01)
*B05B 3/04* (2006.01)

(52) U.S. Cl. ....... 141/88; 141/86; 220/567.1; 220/567.2

(58) Field of Classification Search .................... 141/86, 141/88; 220/86.1, 565, 567.1, 567.2; 222/108; 137/312

See application file for complete search history.

(56) References Cited

U.S. PATENT DOCUMENTS

| | | | |
|---|---|---|---|
| 4,278,115 A | 7/1981 | Briles | |
| 4,491,147 A | 1/1985 | Argandona | |
| 4,520,852 A | 6/1985 | Klein | |
| 4,655,361 A | 4/1987 | Clover | |
| 4,659,251 A | 4/1987 | Petter | |
| 4,685,585 A | 8/1987 | Robbins | |
| 4,717,036 A | 1/1988 | Dundas | |
| 4,763,806 A | 8/1988 | Podgers | |
| 4,809,866 A | 3/1989 | Crocker | |
| 4,895,272 A | 1/1990 | De Benedittis | |
| 4,896,705 A | 1/1990 | Podgers | |
| 4,960,346 A | 10/1990 | Tamayo | |
| 4,986,436 A | 1/1991 | Bambacigno | |
| 5,033,637 A | 7/1991 | Webb | |
| 5,058,633 A | 10/1991 | Sharp | |
| 5,244,307 A | 9/1993 | Wokas | |
| 5,346,093 A | 9/1994 | De Benedittis | |
| 5,381,923 A | 1/1995 | O'Dea | |
| 6,523,581 B2 * | 2/2003 | Pendleton et al. | ............... 141/86 |
| 7,171,994 B1 * | 2/2007 | O'Brien | ..................... 141/311 A |
| 2002/0090267 A1 | 7/2002 | Wimberger | |
| 2005/0077248 A1 | 4/2005 | Stark | |
| 2005/0184007 A1 | 8/2005 | Allard | |
| 2007/0144606 A1 | 6/2007 | O'Brien | |
| 2008/0099490 A1 | 5/2008 | Burwell | |

\* cited by examiner

*Primary Examiner* — Dinh Q Nguyen
(74) *Attorney, Agent, or Firm* — Robert J. Yarbrough; Lipton, Weinberger & Husick (57) ABSTRACT

The Invention is an underground storage tank apparatus and method. A buried underground storage tank has a tank sump and a manway defined by a manhole skirt side wall communicating from the surface of the ground to the tank sump. A sediment trap is disposed annularly within the manway and intercepts water and sediment flowing down the manhole skirt wall. An inside wall of the sediment trap is in an annular spaced-apart relation with a tank sump perimeter watt, which together define an annular space interior volume that receives water that overtops the sediment trap inside wall and which receives liquid that overtops the tank sump perimeter wall.

19 Claims, 8 Drawing Sheets

Fig. 1

Prior Art

UNDERGROUND STORAGE TANK WITH SEDIMENT TRAP

RELATED APPLICATIONS

This application is entitled to priority from Provisional Application No. 61/111,885 filed Nov. 6, 2008 by David E. Stein. Provisional Application No. 61/111,185 file Nov. 4, 2008 is hereby incorporated by reference as if set forth in full herein.

BACKGROUND OF THE INVENTION

1. Field of the Invention

The invention is an apparatus for the capture of sediment in water entering a manhole for an underground storage tank. The invention also is an apparatus providing secondary containment for spills of liquid from within a sump of an underground storage tank.

2. Description of the Related Art

The problem addressed by the Invention is the flooding of electrical pumps and other subterranean systems serving underground storage tanks due to the blinding of underground water drainage systems by sediment and debris.

Underground storage tanks ("USTs") are tanks designed to contain liquids such as petroleum products and are buried below the surface of the ground. A typical UST used in a gasoline filling station may contain 2,000 gallons or more of fuel. In a typical UST installation, the top of the tank is located thirty inches or more below a concrete driving surface. The UST is surrounded by sand, gravel or crushed stone, which provides even support to the tank and acts as a drainage medium to allow water to drain away from the area of the tank. As used in this application, the term 'drainage medium' includes crushed stone, sand, gravel and any equivalent material.

A manway communicates between the surface of the ground and a tank sump at the top of the UST. The tank sump generally is cylindrical in shape and is attached to the top of the tank. A typical tank sump is defined by an open-top, cylindrical perimeter wall that forms a water-tight and liquid-tight connection with the top of the UST. The interior of the tank sump provides access to the tank for adding or removing liquid from the tank, to allow makeup air to enter the tank, or for other access to the interior of the tank. The tank sump may include an electrically operated pump, associated piping and sensors. The pump and piping are configured to withdraw liquid from the bottom of the tank and to discharge the liquid through piping to liquid dispensers. A single UST may incorporate more than one tank sump and be served by more than one manway.

The tank sump perimeter wall serves to contain liquid, such as a petroleum product, that may be spilled or that may leak from the systems serving the UST and that are located within the tank sump. Prevention of release of the liquid into the environment is important for environmental protection and for regulatory compliance. If the liquid escapes from the tank sump, as by overflowing the tank sump perimeter wall, the liquid is released into the environment, causing environmental damage and causing the owner of the UST to incur remediation costs.

A circular manhole skirt having a diameter greater than the tank sump defines a manhole, which is the entrance to the manway. A manhole cover is supported by the manhole skirt and covers the manway. The top of the manhole skirt and manhole cover generally are located at grade so that the manhole skirt and manhole cover do not present obstacles to travel; for example, so that the manhole skirt and cover do not prevent movement of vehicles on pavement located above the UST. As used in this application the term 'grade' means the elevation of the surface of the ground, concrete driving surface or other material below which the underground storage tank is buried.

The tank sump and lower portion of the manhole skirt are annularly arrayed, with the outer diameter of the tank sump perimeter wall being less than the inner diameter of the manhole skirt side wall. The area between the manhole skirt side wall and the tank sump perimeter wall defines an annular space communicating between the manway and the drainage medium surrounding the UST.

In a typical prior art UST installation, water from surface runoff can and does enter the manhole past the manhole cover. The source of the water may be rain, snow, or any other source of water. The water enters the manway at the periphery of the manhole skirt and runs down the manhole skirt side wall. The water encounters the crushed stone surrounding the tank when the water reaches the bottom of the manway. The water drains through the drainage medium and away from the tank.

When surface runoff enters the manway, the water carries with it entrained sediment and debris. When the water flows through the drainage medium, the sediment and debris are left behind in the drainage medium. Over a period of years, the sediment and debris accumulate in the drainage medium, filling the spaces between the individual stones and preventing water from draining through the drainage medium. Over time, the drainage medium becomes blinded by the sediment and debris and ceases to function. The failure of this drainage system allows the tank sump to flood, damaging tank systems such as electrical pumps, sensors, valves, piping or related systems.

BRIEF DESCRIPTION OF THE INVENTION

The invention is a sediment trap system used in conjunction with an underground storage tank. A generally torroidal (donut-shaped) sediment trap has a trap inside wall, a trap outside wall and a trap bottom. The sediment trap defines a water-tight trap interior volume. The top of the sediment trap is open. The trap inside wall is located within a manway serving the underground storage tank and between the tank sump perimeter wall and the manhole skirt side wall.

The trap inside wall and the tank sump perimeter wall are in spaced-apart relation, which may be annular. A annular space is defined by the trap inside wall and the sump perimeter wall. A drainage medium, as defined above, is disposed within the annular space and is in fluid communication with the drainage medium surrounding the underground storage tank. The voids between the individual pieces of the drainage medium allow water to flow readily through the drainage medium and away from the underground storage tank.

The shape of the annular space defined by the spaced-apart relation between the sump perimeter watt and the trap inside wall depends upon the horizontal cross-sectional shapes of the tank sump and the sediment trap inside wall. Where the sump and trap inside wall are circular in horizontal cross section, the annular space will be a circular annular space. Where the sump perimeter wall and trap inside wall are rectangular in horizontal cross section, the annular space will be a rectangular angular space. As used in this application, the term 'annular' means 'ring shaped,' regardless of whether the ring shape is circular, rectangular, or any other shape.

In a first embodiment, the sediment trap and the manhole skirt side wall are formed separately. The inside diameter of the outer watt of the sediment trap of the first embodiment is greater than the outside diameter of the manhole skirt side wall, and the lower portion of the manhole skirt side watt is disposed within the trap interior volume. In a second embodiment, the sediment trap and the manhole skirt side wall are unitary and the manhole skirt side watt defines the outer watt of the sediment trap.

In operation, water entering the manway from the surface flows past the manhole cover, down the interior of the manhole skirt side wall and through the open top of the sediment trap into the interior volume of sediment trap. The sediment trap is water-tight and the water is retained within the sediment trap. The velocity of the water slows, allowing sediment to settle from the water. The settled sediment is deposited on the bottom of the interior volume of the sediment trap. When sufficient water flows into the sediment trap to fill the interior volume, the water, now substantially cleaned of sediment, overflows the inner watt of the sediment trap and into the annular space between the inside wall of the sediment trap and the perimeter wall of the tank sump. The water flows through the drainage medium within the annular space and is drained away from the tank through the drainage medium.

An operator maintains the sediment trap and water drainage system by removing accumulated sediment from the bottom of the interior volume of the trap. Because the sediment and debris in the water entering the drainage medium is substantially reduced, blinding of the drainage medium by sediment and debris is slowed and the life of the drainage medium is extended. Because the top of the trap interior volume is open and due to the shape of the sediment trap, the sediment may be readily removed by the operator, as by use of a familiar shop vacuum cleaner.

The useful life of the drainage medium may be extended further by providing one or more trap drainage pipes. A first end of the trap drainage pipe is in fluid communication with the interior volume of the sediment trap at an elevation higher than the bottom of the sediment trap. Water entering the interior volume of the sediment trap slows and is stored temporarily in the sediment trap, allowing the sediment to settle from the water and to collect in the bottom of the trap interior volume. When the level of water in the sediment trap reaches the elevation of the bottom inside surface of the trap drainage pipe, the water flows from the sediment trap through the trap drainage pipe.

The trap drainage pipe may be perforated and may extend into the drainage medium surrounding the tank. For a perforated trap drainage pipe, the water exits from the perforations in the trap drainage pipe and into the drainage medium. Should the drainage medium along a portion of the perforated pipe become locally blinded by sediment, the water will flow to other perforations along the length of the trap drainage pipe. Should the drainage medium along the entire length of the trap drainage pipe become blinded, the water will accumulate in the sediment trap and will overflow the trap inside wall and flow into the annular space between the sediment trap inside wall and the tank sump perimeter wall, encountering the drainage medium in the annular space and draining away from the tank through the drainage medium.

Multiple perforated trap drainage pipes may be used to carry away the water from the sediment trap, provided the bottom of each pipe is above the elevation of the bottom of the sediment trap. While the trap or annular space drainage pipes may be perforated and drain to the drainage medium surrounding the UST as described above, those drainage pipes may be un-perforated and may convey water to any other suitable location, such as an oil-water separator, a sediment basin, a lateral field, a holding tank, or a water treatment plant.

The bottom of the annular space between the trap inside wall and the tank sump perimeter wall may be sealed. If the bottom of the annular space is sealed, the annular space interior volume is water and liquid-tight. The annular space interior volume then defines a second sediment trap and also defines a secondary containment for liquid, such as a petroleum product, that may be released from the tank sump. For example, a leak or spill of a petroleum product within the tank sump may fill the tank sump and overtop the sump perimeter wall and the petroleum product then would flow into the secondary containment. The secondary containment defined by the Liquid-tight annular space interior volume prevents liquid that escapes from the tank sump from being released into the environment, preventing contamination and preventing the owner of the tank from incurring the costs of remediation of the environmental contamination.

The second sediment trap and secondary containment may be drained by an annular space drainage pipe in fluid communication with the annular space interior volume at an elevation above the bottom of the annular space. Sealing the bottom of the annular space and Locating the annular space drainage pipe above the elevation of the bottom of the annular space allows the second sediment trap to store water and allows additional sediment to settle from the water. Locating the annular space drainage pipe above the elevation of the sealed bottom of the annular space also allows the annular space interior volume to store petroleum or other liquid that escapes from the tank sump, providing the secondary containment for the tank sump.

In the embodiment featuring a sealed annular space bottom, the annular space drainage pipe is not perforated and drains to an oil/water separator, which serves to collect both the water entering the annular space interior volume from the tank sump and the liquid water entering the annular space interior volume from the sediment trap.

DESCRIPTION OF AN EMBODIMENT

The Invention is an apparatus and method for preventing failure of an underground storage tank drainage system due to blinding of the drainage system by sediment. The Invention is also an apparatus and method for providing secondary containment for liquid released within a tank sump.

Figure 1:
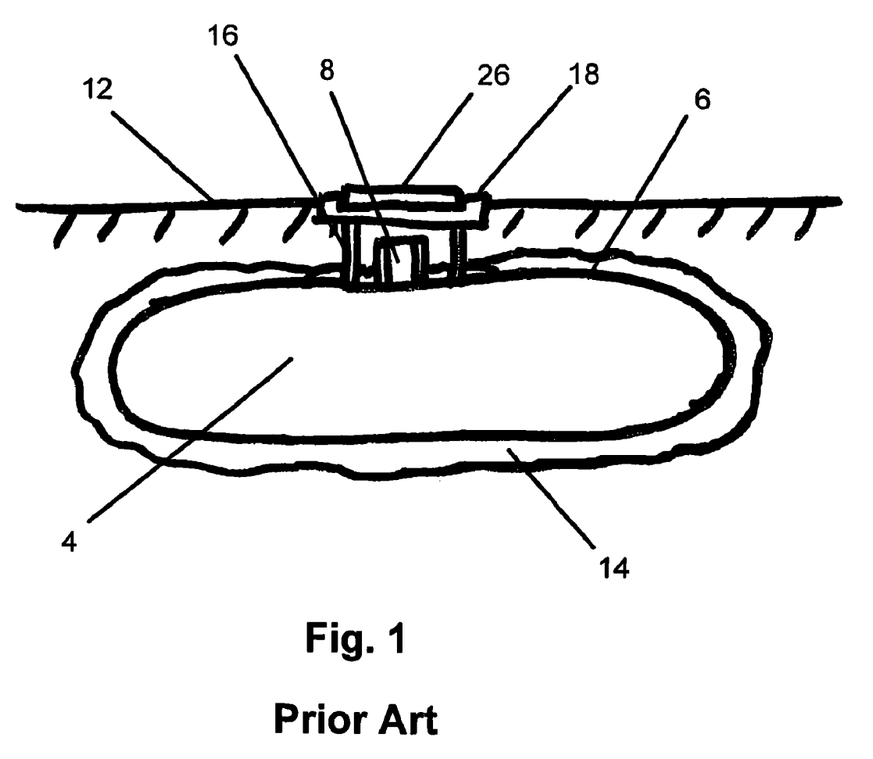
FIG. 1 is a cross section of a prior art underground storage tank system.

FIG. 1 illustrates a prior art underground storage tank system 2. An underground storage tank 4 is buried beneath the surface 12 of the ground. The underground storage tank 4 is surrounded in whole or in part by a drainage medium 14, as defined above. The drainage medium 14 serves to drain water away from the tank 4. A tank sump 8 is defined by sump perimeter wall 10, which is attached to a top side 6 of tank 4. Sump perimeter wall 10 forms a water and liquid-tight seal with top 6 of tank 4. Tank sump 8 contains tank 4 systems for access to the interior of the tank 4, such as a pump, vents, fill tubes, or other tank 4 systems or penetrations. Access to tank sump 8 is through a manway 24 from the surface 12. A manhole skirt 16 has a top side 18 that supports a manhole cover 26. The manhole cover 26 covers the manhole opening 20 and manway 24. A manhole skirt side wall 22 defines the manway 24 and prevents collapse of drainage medium 14 and earth into manway 24. Water entering the manway 24 past the manhole cover 26 enters the drainage medium 14 at the bottom of the manhole skirt side wall 22 and drains away from the underground storage tank 4. The drainage medium 14 at the bottom of the manhole skirt side wall 22 can and does become blinded by sediment entrained in the water entering the manway 24 through the manhole 20.

Figure 2:
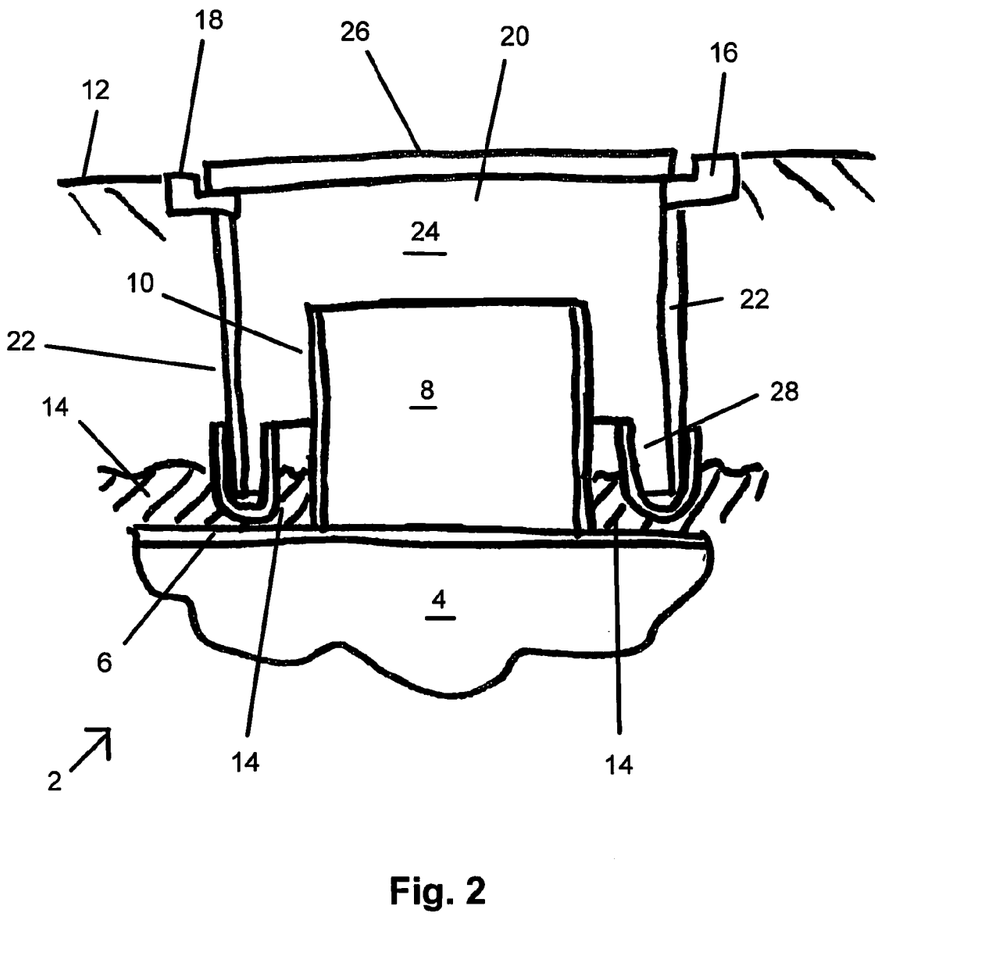
FIG. 2 is a detail cross section of a first embodiment of the underground storage tank system of the Invention showing the relation between the sediment trap and the manhole skirt, tank sump and manhole cover.
Figure 3:
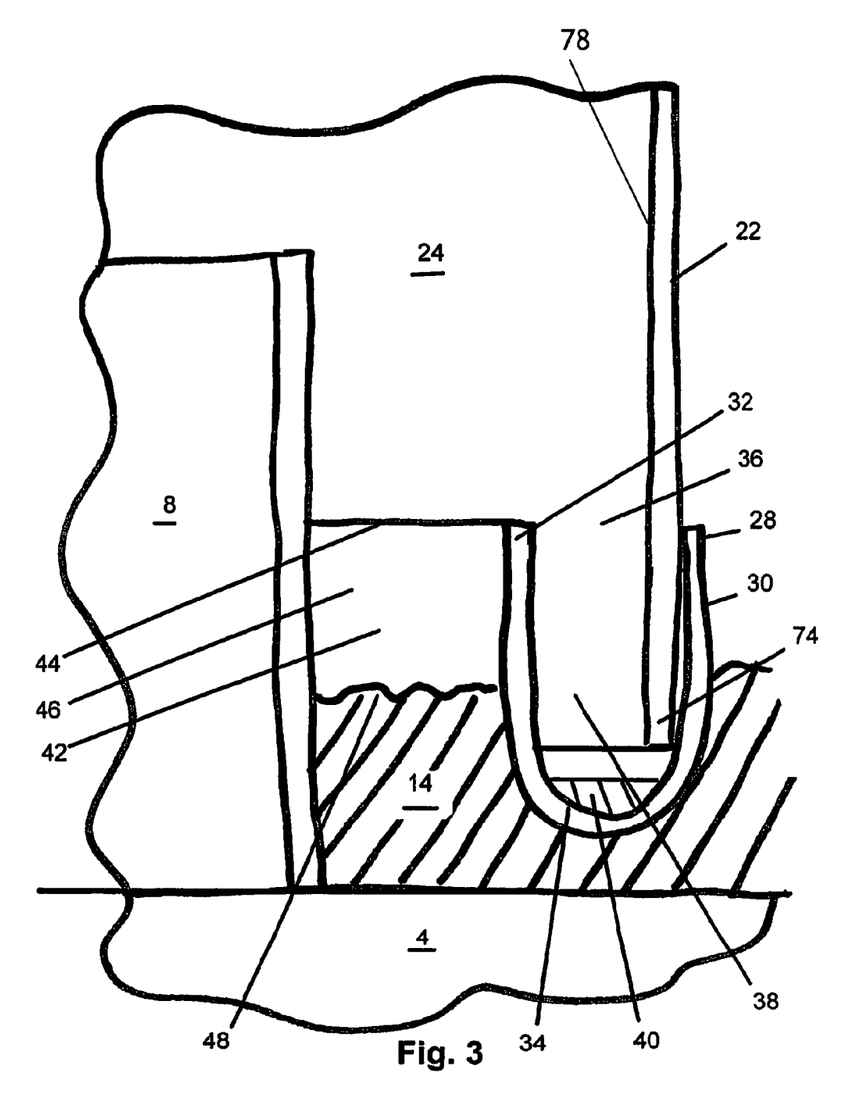
FIG. 3. is a detail of FIG. 2 and is a cross section of a portion of the first embodiment showing the relation between the sediment trap, manhole skirt, tank sump and drainage medium.

FIGS. 2 and 3 illustrate a first embodiment of the Invention. FIG. 3 is a detail of FIG. 2. From FIGS. 2 and 3, sediment trap 28 is generally torroidal; that is, shaped like a donut. The sediment trap 28 has a trap outside wall 30, a trap inside wall 32 and a trap bottom 34. Trap open top 36 is open, allowing water and sediment to enter the sediment trap 28. The trap outside wall 30, trap inside wall 32 and trap bottom 34 are water-tight and define trap interior volume 38. The sediment trap 28 and the manhole skirt side wall 22 are formed separately and the inside diameter of the outside wall 30 of the sediment trap 28 is greater than the outside diameter of the manhole skirt side wall 22. The bottom portion 74 of the manhole skirt side wall 22 is disposed within the trap interior volume 38 and manhole skirt side wall defines a manhole skirt side wall interior surface 78.

Water entering the manway 24 flows down the manhole skirt side wall 22 and enters the trap interior volume 38 through the trap open top 36 and is retained in the water-tight trap interior volume 38. When the water enters the trap 28, the velocity of the water slows and sediment 40 entrained in the water settles from the water and is deposited on the trap bottom 34. Removing sediment 40 from the trap bottom 34 is an item of regular maintenance for the underground storage tank system 2. Removing sediment 40 from the trap bottom 34 may be readily accomplished through use of a familiar shop vacuum.

The sump perimeter wall 10, the sediment trap 28 and skirt side wall 22 are generally circular in horizontal cross section and are arrayed annularly. The trap inside wall 32 and the sump perimeter wall 10 are in an annular spaced-apart relation and define an annular space 42 between the trap inside wall 32 and the sump perimeter wall 10. The annular space 42 has an annular space open top 44 and defines an annular space interior volume 46. In the first embodiment illustrated by FIGS. 2 and 3, the annular space 42 features an opening 48 communicating between the annular space interior volume and the drainage medium 14 that surrounds the underground storage tank 4.

If water accumulating in the trap interior volume 38 fills the trap interior volume, the water will overtop the trap inside wall 32 and will flow into the annular space interior volume 46. The water will enter the drainage medium 14 through the opening 48 and will drain away from tank 4. The amount of sediment 40 entrained in the water is reduced, extending the life of drainage medium 14.

Figure 4:
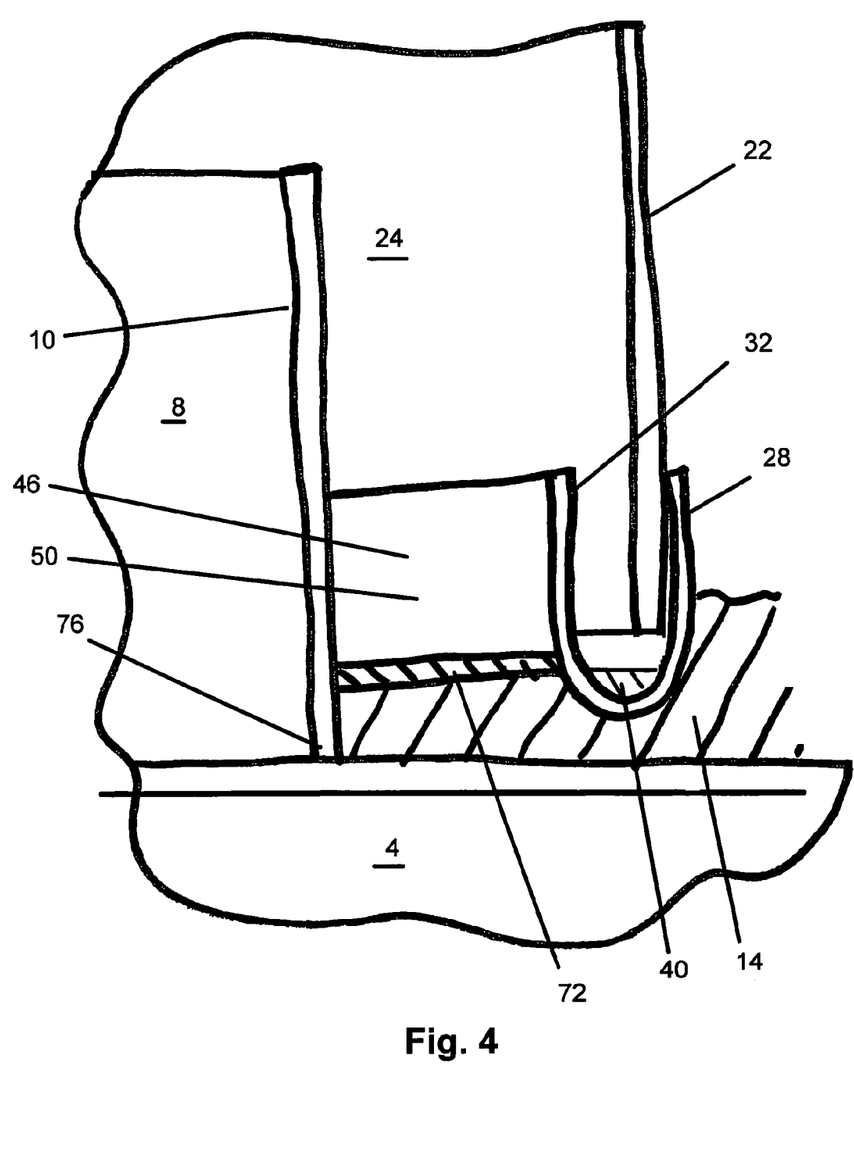
FIG. 4. is a detail cross section of a portion of a second embodiment showing the relation between the first and second sediment traps.

FIG. 4 illustrates a second embodiment of the Invention. In this second embodiment, annular space interior volume 46 has a bottom side 72. Bottom side 72 in combination with trap inside wall 32 and sump perimeter wall 10 are water-tight and together define a second sediment trap 50. Second sediment trap 50 lacks opening 48 and prevents water entering the annular space interior volume from entering drainage medium 14 through the bottom 72 of the annular space interior volume 46.

In the second embodiment illustrated by FIG. 4, water overtopping trap inside wall 32 flows into annular space interior volume 46. The water is retained within annular space interior volume 46. The water slows, and sediment 40 entrained in the water settles on bottom 72 of annular space interior volume 46. Removal of water and accumulated sediment 40 is an item of regular maintenance for the second embodiment illustrated by FIG. 4.

Figure 5:
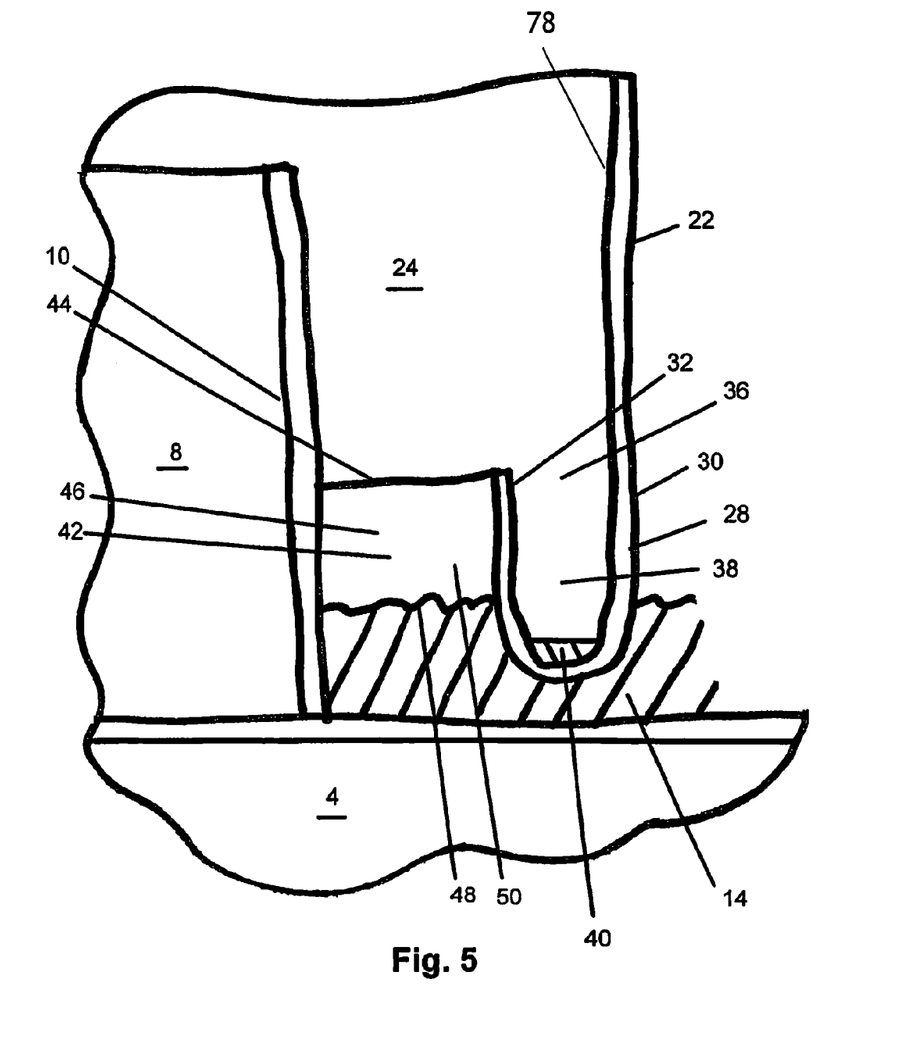
FIG. 5 is a detail cross section of a portion of a third embodiment showing a unitary manhole skirt and sediment trap.

FIG. 5 illustrates an additional embodiment of the Invention. As shown by FIG. 5, the trap outside wall 30 may be defined by the manhole skirt side wall 22, so that the sediment trap 28 and the skirt side wall 22, including the manhole skirt side wall interior surface 78, are formed as a single unit. The sediment trap of the embodiment of FIG. 5 in all other respects operates in the same manner as the sediment trap 28 illustrated by FIGS. 2 and 3.

Figure 6:
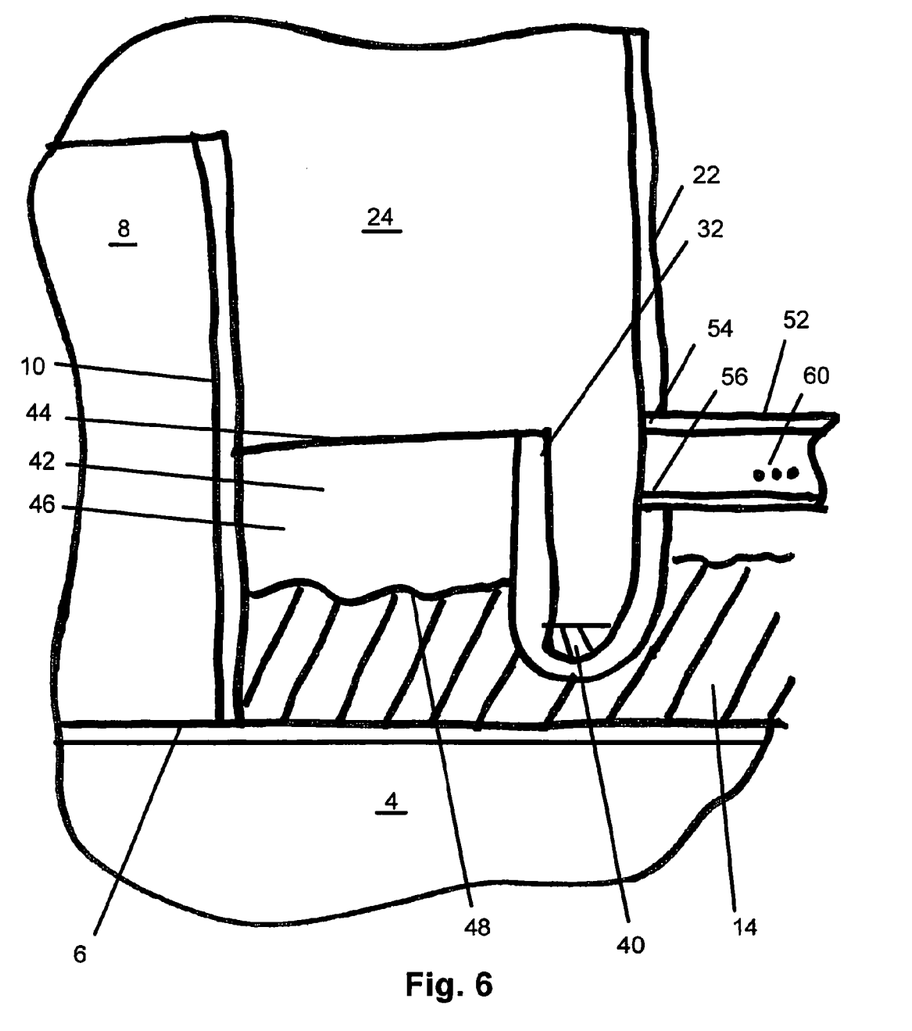
FIG. 6 is a detail cross section showing the relation between the sediment trap and a trap drainage pipe.

FIG. 6 illustrates an apparatus to further extending the life of the drainage system of an underground storage tank 4. A trap drainage pipe 52 penetrates the trap outside wall 30. A first end 54 of the trap drainage pipe 52 intersects the trap interior volume 38. The trap drainage pipe 52 has a bottom inside surface 56 at the first end 54. The elevation of the bottom inside surface 56 of the trap drainage pipe 52 is greater than the elevation of the trap bottom 34 and is less than the elevation of the top of the trap inside wall. The trap drainage pipe 52 therefore will not drain all of the water from the sediment trap 28.

In operation of the apparatus of FIG. 6, the sediment trap 28 will receive water entering the manway 24 and sediment 40 will collect on the trap bottom 34. Water accumulating in the sediment trap interior volume 38 will rise until the water encounters the bottom inside surface 56 of the trap drainage pipe 52. The water will enter the trap drainage pipe 52, which is sloped to drain the water away from the manway 24.

The trap drainage pipe 52 may direct the water to any suitable location, such as an oil-water separator, a lateral drainage field, a pond, a waste treatment system, a holding tank, or any other suitable disposal means as is known in the art. The trap drainage pipe 52 may include perforations along a portion of its length and be laid in the drainage medium 14, in which event the water will drain through the perforations and into the drainage medium and away from the tank 4. Should sediment entrained in the water blind the drainage medium proximal to a perforation, then the water will flow to other perforations. Should the drainage medium proximal to all of the perforations in the trap drainage pipe be blinded, then the water will not flow through the trap drainage pipe and wilt rise in the sediment trap until the water overtops the trap inside wall. The water then will enter the annular space interior volume and wilt discharge through the opening in the bottom of the annular space interior volume into the drainage medium 14.

Figure 7:
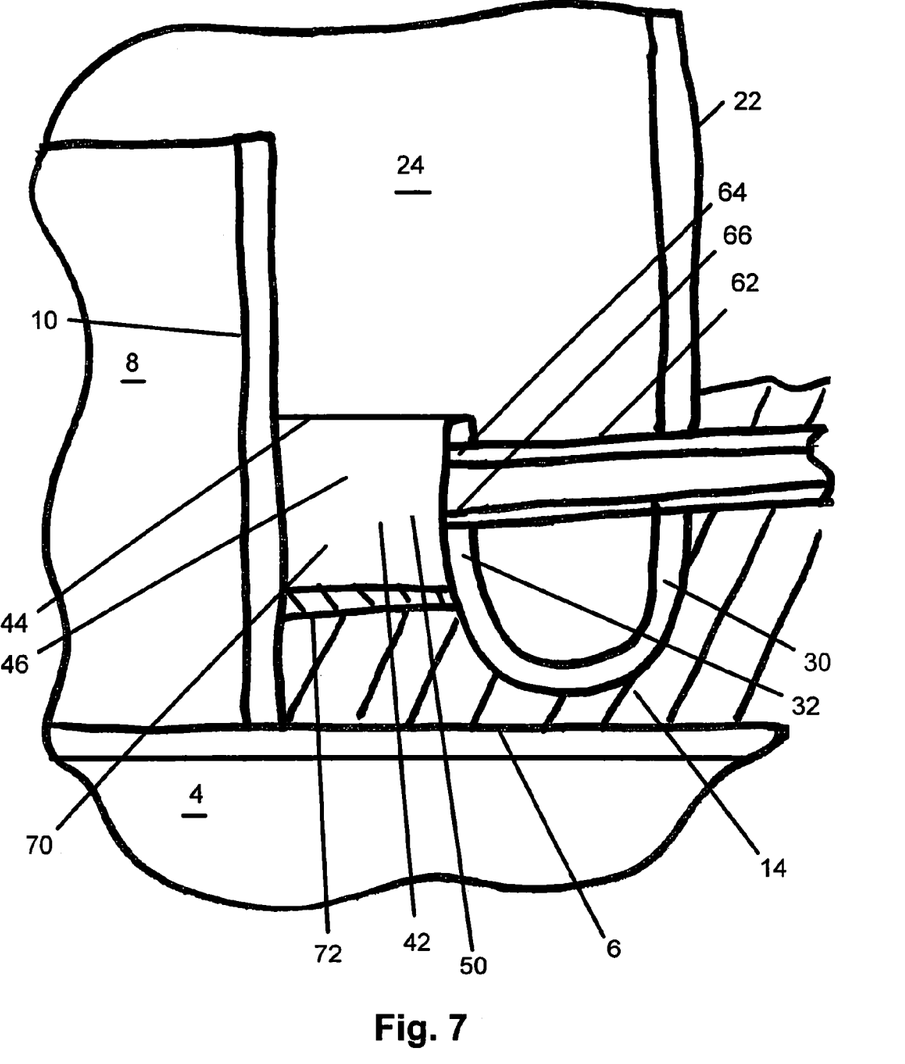
FIG. 7 is a detail cross section showing the relation between the second sediment trap and the annular space drainage pipe.

FIG. 7 illustrates an additional apparatus for extending the life of the underground storage tank drainage system and for preventing release into the environment of a Liquid, such as a petroleum product, that my leak or otherwise be released from the tank sump 8. Annular space bottom 72 is sealed so that the annular space interior volume 46 is water and liquid-tight. The water-tight annular space interior volume 46 defines a second sediment trap 50. Water and sediment that overtop trap interior wall 32 flow into the second sediment trap 50, slowing the water and allowing sediment 40 to settle out of the water and onto the bottom 72 of the second sediment trap 50.

As shown by FIG. 7, the annular space interior volume 46 also is Liquid-tight and defines secondary containment 70 for the tank sump 8. If liquid, such as a petroleum product, is released or spilled within the tank sump 8 and overtops sump perimeter wall 10, the liquid will flow into the secondary containment 70 and be contained within the secondary containment 70.

An annular space drainage pipe 62 penetrates both the trap outside wall 30 and the trap inside wall 32. The first end 64 of the annular space drainage pipe 62 communicates with the annular space interior volume 46. The annular space drainage pipe 62 has a bottom inside surface 66 at the first end 64. The bottom inside surface 66 of the annular space drainage pipe is Located at an elevation above the elevation of the annular space bottom 72 and below an elevation of the top of the sump perimeter wall 10 and the top of trap inside wall 32.

Water or liquid accumulating in the annular space interior volume 46 will rise until the water or liquid reaches the elevation of the annular space drainage pipe 62 bottom inside surface 66. The water or liquid wilt then enter the annular space drainage pipe 62, which is sloped to drain the water or liquid away from the manway 24. The water is prevented from overtopping the sump perimeter wall 10 and entering the tank sump 8. Liquid is prevented from overtopping the trap inside wall 32. The water and liquid from the annular space drainage pipe 62 preferably are discharged to an oil-water separator through a pipe 62 having no perforations 60. The oil-water separator is known in the art and stores and separates the liquid and the water for proper disposal.

Figure 8:
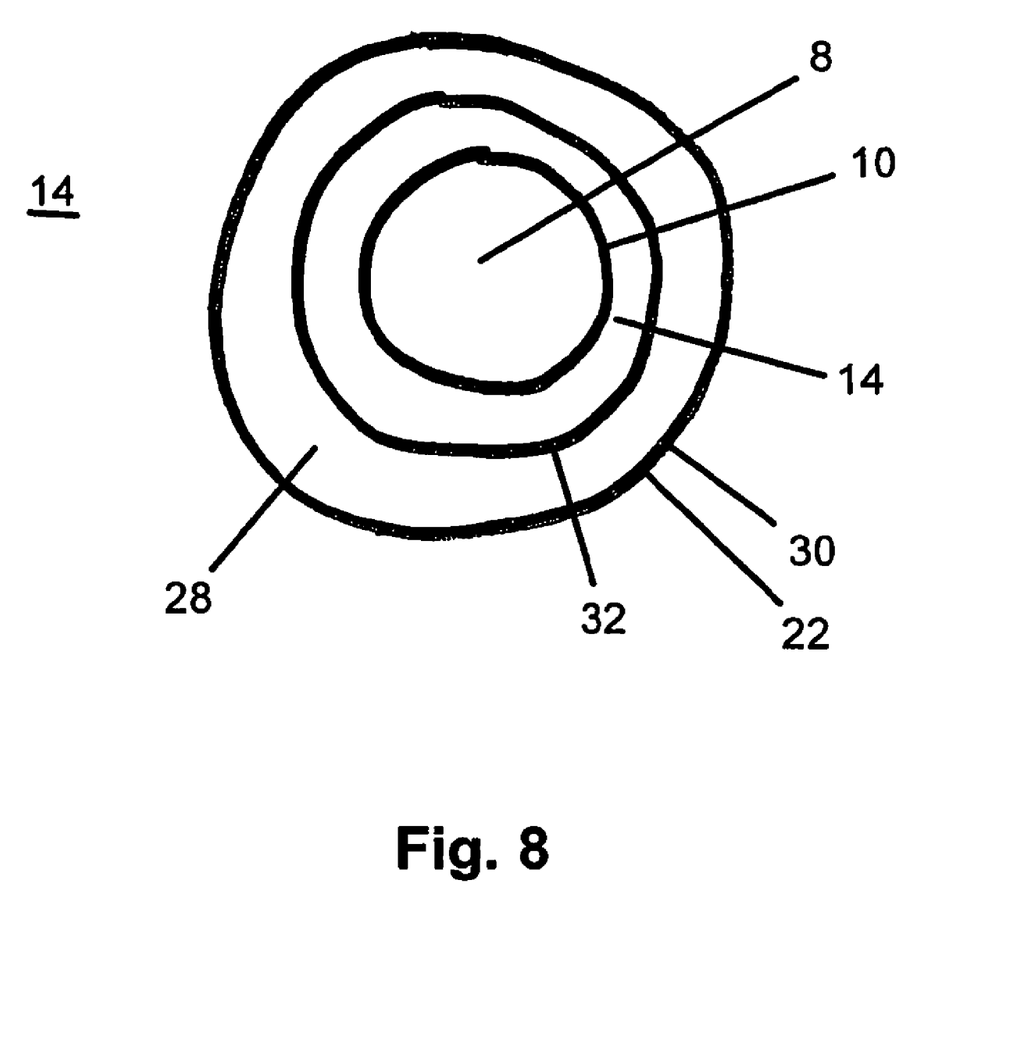
FIG. 8 is a horizontal cross section through the sediment trap, annular space and tank sump of FIG. 5.

FIG. 8 is a horizontal cross section of the apparatus of FIG. 5 through the tank sump 8 and sediment trap 28 where the trap outer watt 30 and the skirt side wall 22 are unitary and formed as a single piece. FIG. 8 illustrates the annular nature of the sediment trap 28 and the annular space 42 in a circular embodiment.

LIST OF CLAIM ELEMENTS

The following is a list of elements used in the claims and the corresponding element number in the specification and drawings.
2. An underground storage tank system apparatus
4. an underground storage tank
6. a top side of the underground storage tank
8. a sump
10. a sump perimeter wall
12. a surface of a ground
14. a drainage medium
16. a manhole skirt
18. a skirt top side
20. a manhole opening;
22. a manhole skirt side wall
24. a manway
26. a manhole cover,
28. a sediment trap,
30. a trap outside wall,
32. a trap inside wall,
34. a trap bottom,
36. a trap open top,
38. a trap interior volume,
40. a sediment
42. an annular space
44. an annular space open top
46. an annular space interior volume,
48. an opening communicating between said annular space interior volume and said drainage medium
50. a second sediment trap,
52. A trap drainage pipe,
54. a first end,
56. a bottom inside surface of said trap drainage pipe,
60. a perforated portion,
62. An annular space drainage pipe,
64. a first end,
66. a bottom inside surface of said annular space drainage pipe,
70. a secondary containment,
72. an annular space bottom,
74. a bottom portion of said manhole skirt outside wall,
76. a lower side of said sump perimeter wall.

In describing the above embodiments of the invention, specific terminology is selected for the sake of clarity. However, the invention is not intended to be limited to the specific terms so selected, and it is to be understood that each specific term includes all technical equivalents that operate in a similar manner to accomplish a similar purpose.

I claim:

1. An underground storage tank system apparatus, the apparatus comprising:
   a. an underground storage tank for containing a liquid, said underground storage tank having a top side;
   b. a tank sump attached to said top side of said underground storage tank, said tank sump having a sump perimeter wall, said tank sump being located below a surface of a ground;
   c. a manhole skirt side wall, said manhole skirt side wall having a manhole skirt side wall interior surface, said manhole skirt side wall defining a manway, said manway communicating between said surface of said ground and said tank sump;
   d. an annular sediment trap, said annular sediment trap defining a trap outside wall, a trap inside wall, a trap bottom, and a trap open top wherein said trap outside wall, said trap bottom and said trap inside wall together define a trap interior volume, said trap interior volume being water-tight, said trap interior volume being in fluid communication with said manway, said manhole skirt side wall interior surface extending into said trap interior volume, whereby a water entering said manway from said surface of said ground enters said trap interior volume through said trap open top;
   e. said trap inside wall and said sump perimeter wall being in an spaced-apart relation and together defining an annular space, said annular space having an annular space open top and an annular space interior volume, whereby when said water entering said trap interior volume accumulates and overtops said trap interior wall, said water enters said annular space through said annular space open top.

2. An underground storage tank system apparatus, the apparatus comprising:
   a. an underground storage tank for containing a liquid, said underground storage tank having a top side;
   b. a sump attached to said top side of said underground storage tank, said sump having a sump perimeter wall, said sump being located below a surface of a ground;

c. a manhole skirt side wall, said manhole skirt side wall having a manhole skirt side wall interior surface, said manhole skirt side wall defining a manway, said manway communicating between said surface of said ground and said sump;

d. an annular sediment trap, said annular sediment trap defining a trap outside wall, a trap inside wall, a trap bottom, and a trap open top wherein said trap outside wall, said trap bottom and said trap inside wall together define a trap interior volume, said trap interior volume being water-tight, said trap interior volume being in fluid communication with said manway, said manhole skirt side wall interior surface extending into said trap interior volume, said trap inside wall and said sump perimeter wall being in an spaced-apart relation, whereby a water entering said manway from said surface of said ground enters said trap interior volume through said trap open top and a sediment entrained in said water settles from said water and is deposited on said trap bottom;

e. said trap inside wall and said sump perimeter wall together define an annular space having an annular space open top and an annular space interior volume, whereby when said water entering said trap interior volume accumulates and overtops said trap interior wall, said water enters said annular space through said annular space open top;

f. a drainage medium proximal to said sump and outside of said underground storage tank wherein said sump perimeter wall and said trap inside wall in combination define an opening, said annular space interior volume and said drainage medium being in fluid communication through said opening, whereby when said water in said sediment trap overtops said trap interior wall and enters said annular space interior volume, said water passes through said opening and enters said drainage medium.

3. The underground tank system apparatus of claim 1 wherein said annular space interior volume is water tight and said annular space interior volume defines a second sediment trap, whereby said sediment entrained in said water overtopping said trap interior wall is retained within said second sediment trap.

4. An underground storage tank system apparatus, the apparatus comprising:

a. an underground storage tank for containing a liquid, said underground storage tank having a top side;

b. a sump attached to said top side of said underground storage tank, said sump having a sump perimeter wall, said sump being located below a surface of a ground;

c. a manhole skirt side wall, said manhole skirt side wall having a manhole skirt side wall interior surface, said manhole skirt side wall defining a manway, said manway communicating between said surface of said ground and said sump;

d. an annular sediment trap, said annular sediment trap defining a trap outside wall, a trap inside wall, a trap bottom, and a trap open top wherein said trap outside wall, said trap bottom and said trap inside wall together define a trap interior volume, said trap interior volume being water-tight, said trap interior volume being in fluid communication with said manway, said manhole skirt side wall interior surface extending into said trap interior volume, said trap inside wall and said sump perimeter wall being in an spaced-apart relation, whereby a water entering said manway from said surface of said ground enters said trap interior volume through said trap open top and a sediment entrained in said water settles from said water and is deposited on said trap bottom;

e. said trap inside wall and said sump perimeter wall together define an annular space having an annular space open top and an annular space interior volume, whereby when said water entering said trap interior volume accumulates and overtops said trap interior wall, said water enters said annular space through said annular space open top;

f. a trap drainage pipe, said trap drainage pipe having a first end, said first end of said trap drainage pipe being in fluid communication with said trap interior volume, said trap drainage pipe first end defining a bottom inside surface of said trap drainage pipe, said bottom inside surface being at an elevation greater than said trap bottom, said elevation of said bottom inside surface of said trap drainage pipe being less than said elevation of said trap inside wall, whereby water accumulating in said trap interior volume will overtop said bottom inside surface of said trap drainage pipe and enter said trap drainage pipe prior to overtopping said trap inside wall.

5. The underground tank storage system apparatus of claim 4, the apparatus further comprising a drainage medium outside of said underground storage tank wherein said trap drainage pipe has a perforated portion, said perforated portion being in fluid communication with said drainage medium.

6. The underground tank storage system apparatus of claim 3, the apparatus further comprising:

an annular space drainage pipe, said annular space drainage pipe having a first end, said first end of said annular space drainage pipe being in fluid communication with said annular space interior volume, said annular space drainage pipe first end defining a bottom inside surface of said annular space drainage pipe, said bottom inside surface being at an elevation greater than a bottom of said annular space, said elevation of said bottom inside surface of said annular space drainage pipe being less than said elevation of said sump perimeter wall, whereby water accumulating in said annular space interior volume will overtop said bottom surface of said annular space drainage pipe and enter said annular space drainage pipe prior to overtopping said sump perimeter wall.

7. The underground storage tank apparatus of claim 6 wherein said annular space interior volume is liquid tight, said bottom surface of said annular space drainage pipe being at said elevation that is less than said elevation of said trap inside wall, said annular space drainage pipe being unperforated, said annular space interior volume being in fluid communication with an oil-water separator through said annular space drainage pipe, whereby said annular space interior volume defines a secondary containment for a release of said liquid from said tank sump.

8. The underground storage tank apparatus of claim 1 wherein said sediment trap outside wall is defined by said manhole skirt side wall, whereby said sediment trap is integral to said manhole skirt side wall.

9. The underground storage tank apparatus of claim 1 wherein a bottom portion of said manhole skirt side wall is disposed within said trap interior volume, whereby said sediment trap is not integral with said manhole skirt side wall.

10. The underground storage tank apparatus of claim 1 wherein said annular sediment trap is generally circular in horizontal cross section, said trap interior volume and said annular space interior volume being annularly located within said manway.

11. A method for providing an underground storage tank system, the method comprising the steps of:

a. providing an underground storage tank for containing a liquid, said underground storage tank having a top side and a tank sump attached to said top side of said underground storage tank, said tank sump having a sump perimeter wall, said tank sump being located below a surface of a ground;

b. providing a manhole skirt side wall, said manhole skirt side wall having a manhole skirt side wall interior surface, said manhole skirt side wall defining a manway, said manway communicating between said surface of said ground and said tank sump;

c. providing an annular sediment trap, said annular sediment trap defining a trap outside wall, a trap inside wall, a trap bottom, and a trap open top wherein said trap outside wall, said trap bottom and said trap inside wall together define a trap interior volume, said trap interior volume being water-tight, said trap interior volume being in fluid communication with said manway, said manhole skirt side wall interior surface extending into said trap interior volume, whereby a water entering said manway from said surface of said ground enters said trap interior volume through said trap open top, said trap inside wall and said sump perimeter wall being in an spaced-apart relation and together defining an annular space, said annular space having an annular space open top and an annular space interior volume, whereby when said water entering said trap interior volume accumulates and overtops said trap interior wall, said water enters said annular space through said annular space open top.

12. The method of claim 11 wherein said annular space defining an annular space bottom, said annular space bottom being in fluid communication with a drainage medium, said drainage medium being disposed in proximity to said underground storage tank outside of said sump, whereby water overtopping said trap inside wall will enter said annular space and be discharged from said annular space bottom through said drainage medium.

13. The method of claim 12, the method further comprising: providing a trap drainage pipe having a first end and a first end bottom surface, said first end of said trap drainage pipe being in fluid communication with said trap interior volume, an elevation of said first end bottom surface of said trap drainage pipe being less than said elevation of said trap inside wall and greater than said elevation of said trap bottom, whereby water accumulating in said trap interior volume will drain through said drainage pipe and will not overtop said trap inside wall.

14. The method of claim 13 wherein said drainage pipe is perforated and is located within said drainage medium.

15. The method of claim 11 wherein said annular space defines an annular space bottom, said annular space bottom, said sump perimeter wall and said trap inside wall in combination defining a water-tight annular space interior volume, whereby water overtopping said sediment trap inner wall is collected in said second sediment trap and said sediment entrained in said water is collected on said annular space bottom.

16. The method of claim 15, the method further comprising: providing an annular space drainage pipe having a first end and a first end bottom surface, said first end of said annular space drainage pipe being in fluid communication with said annular space interior volume, an elevation of said first end bottom surface of said annular space drainage pipe being less than said elevation of said sump perimeter wall, less than said elevation of said trap inside wall and greater than said elevation of said annular space bottom, whereby water accumulating in said annular space interior volume will drain through said annular space drainage pipe and will not overtop said sump perimeter wall.

17. The method of claim 16 wherein said drainage pipe is perforated and is located within said drainage medium.

18. The method of claim 16 wherein said drainage pipe is unperforated and drains to an oil-water separator, whereby said annular space interior volume defines a secondary containment for a spill of said liquid within said tank sump.

19. The underground storage tank system apparatus of claim 1 wherein said annular sediment trap is generally rectangular in horizontal cross section, said trap interior volume and said annular space interior volume being annularly located within said manway.

* * * * *

UNITED STATES PATENT AND TRADEMARK OFFICE
CERTIFICATE OF CORRECTION

| | | |
|---|---|---|
| PATENT NO. | : 8,156,969 B2 | Page 1 of 1 |
| APPLICATION NO. | : 12/420594 | |
| DATED | : April 17, 2012 | |
| INVENTOR(S) | : David E. Stein | |

It is certified that error appears in the above-identified patent and that said Letters Patent is hereby corrected as shown below:

On the title page item (60), Related U.S. Application Data, should read:

--Provisional application No. 61/111,885, filed Nov. 6, 2008.--.

On the title page item (57), Abstract, line 8, the word "watt" should be --wall--.

Column 2, lines 55 and 67, the word "watt," should be --wall--.

Column 3, lines 2, 5 and 17, the word "watt," should be --wall--.

Column 4, line 12, the word "Liquid" should be --liquid--.

Column 6, lines 60 and 62, the word "wilt," should be --will--; and in line 67, the word "Liquid" should be --liquid--.

Column 7, line 11, the word "Liquid" should be --liquid--; in line 22, the word "Located" should be --located--; in line 29, the word "wilt," should be --will--; in line 41, the word "watt" should be --wall--.

Signed and Sealed this
Seventh Day of August, 2012

David J. Kappos
*Director of the United States Patent and Trademark Office*